United States Patent
Farré Pérez et al.

(10) Patent No.: US 12,254,418 B2
(45) Date of Patent: Mar. 18, 2025

(54) SYSTEMS AND METHODS FOR HEURISTIC ALGORITHMS WITH VARIABLE EFFORT PARAMETERS

(71) Applicant: D-WAVE SYSTEMS INC., Burnaby (CA)

(72) Inventors: Pau Farré Pérez, Vancouver (CA); Jack R. Raymond, Vancouver (CA)

(73) Assignee: D-WAVE SYSTEMS INC., Burnaby (CA)

(*) Notice: Subject to any disclaimer, the term of this patent is extended or adjusted under 35 U.S.C. 154(b) by 0 days.

(21) Appl. No.: 18/126,566

(22) Filed: Mar. 27, 2023

(65) Prior Publication Data

US 2023/0316094 A1   Oct. 5, 2023

Related U.S. Application Data

(60) Provisional application No. 63/324,721, filed on Mar. 29, 2022.

(51) Int. Cl.
  *G06N 5/01* (2023.01)
  *G06F 9/445* (2018.01)
  *G06N 10/40* (2022.01)

(52) U.S. Cl.
  CPC .......... *G06N 5/01* (2023.01); *G06F 9/44505* (2013.01); *G06N 10/40* (2022.01)

(58) Field of Classification Search
  CPC ....... G06N 5/01; G06N 10/40; G06F 9/44505
  (Continued)

(56) References Cited

U.S. PATENT DOCUMENTS 5,134,685 A * 7/1992 Rosenbluth ............ G06N 3/065
  706/30
5,308,931 A * 5/1994 Griffen ................. G01G 3/1414
  177/25.14

(Continued)

FOREIGN PATENT DOCUMENTS

WO     0167186 A1    9/2001
WO  2005093649 A1   10/2005
(Continued)

OTHER PUBLICATIONS

Aonishi, et al., "Statistical mechanics of CDMA multiuser detector implemented in coherent Issing machine", Journal of Applied Physics, 124, 233102 (2008), 10 pages.

(Continued)

*Primary Examiner* — Paul R. Myers
(74) *Attorney, Agent, or Firm* — Cozen O'Connor

(57) ABSTRACT

A heuristic solver is wrapped in a meta algorithm that will perform multiple sub-runs within the desired time limit, and expand or reduce the effort based on the time it has taken so far and the time left. The goal is to use the largest effort possible as this typically increases the probability of success. In another implementation, the meta algorithm iterates the time-like parameter from a small value, and determine the next test-value so as to minimize time to target collecting data at large effort only as necessary. The meta algorithm evaluates the energy of the solutions obtained to determine whether to increase or decrease the value of the time-like parameter. The heuristic algorithm may be Simulated Annealing, the heuristic algorithm may run on a quantum processor, including a quantum annealing processor or a gate-model quantum processor.

8 Claims, 3 Drawing Sheets

(58) Field of Classification Search
USPC .......................................................... 713/100
See application file for complete search history.

(56) References Cited

U.S. PATENT DOCUMENTS

| | | | | |
|---|---|---|---|---|
| 5,416,851 | A * | 5/1995 | Huttenlocher | G06V 30/184 |
| | | | | 382/199 |
| 5,510,995 | A * | 4/1996 | Oliver | G06T 17/00 |
| | | | | 700/182 |
| 5,548,697 | A * | 8/1996 | Zortea | H04N 9/646 |
| | | | | 706/2 |
| 6,389,374 | B1 * | 5/2002 | Jain | G06F 30/3323 |
| | | | | 703/2 |
| 6,487,310 | B1 * | 11/2002 | Bishop | G07C 9/35 |
| | | | | 382/187 |
| 6,490,572 | B2 | 12/2002 | Akkiraju et al. | |
| 6,578,018 | B1 | 6/2003 | Ulyanov | |
| 6,597,660 | B1 * | 7/2003 | Rueda | H04L 43/00 |
| | | | | 370/230.1 |
| 6,838,694 | B2 | 1/2005 | Esteve et al. | |
| 6,904,421 | B2 | 6/2005 | Shetty | |
| 6,922,713 | B2 | 7/2005 | Walster et al. | |
| 7,003,739 | B2 | 2/2006 | Gasanov et al. | |
| 7,335,909 | B2 | 2/2008 | Amin et al. | |
| 7,533,068 | B2 | 5/2009 | Maassen et al. | |
| 7,619,437 | B2 | 11/2009 | Thom et al. | |
| 7,624,088 | B2 | 11/2009 | Johnson et al. | |
| 7,800,395 | B2 | 9/2010 | Johnson et al. | |
| 7,843,209 | B2 | 11/2010 | Berkley | |
| 7,844,656 | B2 | 11/2010 | Macready et al. | |
| 7,870,087 | B2 | 1/2011 | Macready et al. | |
| 7,876,248 | B2 | 1/2011 | Berkley et al. | |
| 7,877,333 | B2 | 1/2011 | Macready | |
| 7,898,282 | B2 | 3/2011 | Harris et al. | |
| 7,899,852 | B2 | 3/2011 | Amin | |
| 8,098,179 | B2 | 1/2012 | Bunyk et al. | |
| 8,139,656 | B2 | 3/2012 | Shental et al. | |
| 8,169,231 | B2 | 5/2012 | Berkley | |
| 8,175,995 | B2 | 5/2012 | Amin | |
| 8,190,548 | B2 | 5/2012 | Choi | |
| 8,195,596 | B2 | 6/2012 | Rose et al. | |
| 8,195,726 | B2 | 6/2012 | Macready et al. | |
| 8,229,863 | B2 | 7/2012 | Amin et al. | |
| 8,244,650 | B2 | 8/2012 | Rose | |
| 8,244,662 | B2 | 8/2012 | Coury et al. | |
| 8,446,842 | B2 | 5/2013 | Cao et al. | |
| 8,494,993 | B2 | 7/2013 | Harris et al. | |
| 8,536,566 | B2 | 9/2013 | Johansson et al. | |
| 8,560,282 | B2 | 10/2013 | Love et al. | |
| 8,611,974 | B2 | 12/2013 | Maibaum et al. | |
| 8,700,689 | B2 | 4/2014 | Macready et al. | |
| 8,892,857 | B2 | 11/2014 | Ozols et al. | |
| 8,977,576 | B2 | 3/2015 | Macready | |
| 8,996,846 | B2 * | 3/2015 | Laine | G06F 9/3888 |
| | | | | 712/17 |
| 9,015,215 | B2 | 4/2015 | Berkley et al. | |
| 9,026,574 | B2 | 5/2015 | Macready et al. | |
| 9,037,598 | B1 * | 5/2015 | Morton | G06F 16/2477 |
| | | | | 707/706 |
| 9,178,154 | B2 | 11/2015 | Bunyk | |
| 9,218,567 | B2 | 12/2015 | Macready et al. | |
| 9,396,440 | B2 | 7/2016 | Macready et al. | |
| 9,501,747 | B2 | 11/2016 | Roy | |
| 9,647,662 | B1 | 5/2017 | Abutaleb et al. | |
| 10,275,422 | B2 | 4/2019 | Israel et al. | |
| 10,769,545 | B2 | 9/2020 | Amin et al. | |
| 11,138,511 | B2 | 10/2021 | Yarkoni et al. | |
| 2001/0034588 | A1 * | 10/2001 | Agrawals | G01C 21/36 |
| | | | | 703/2 |
| 2002/0152057 | A1 * | 10/2002 | Wang | G16C 20/62 |
| | | | | 703/6 |
| 2002/0157009 | A1 | 10/2002 | Yamamoto et al. | |
| 2002/0188438 | A1 | 12/2002 | Knight et al. | |
| 2003/0140019 | A1 | 7/2003 | Gutta et al. | |
| 2005/0021583 | A1 | 1/2005 | Andrzejak et al. | |
| 2005/0066301 | A1 | 3/2005 | Lorenz et al. | |
| 2005/0096884 | A1 * | 5/2005 | Fishkin | G06F 30/00 |
| | | | | 716/132 |
| 2005/0097286 | A1 * | 5/2005 | Karlsson | G06F 16/278 |
| | | | | 711/159 |
| 2005/0273306 | A1 | 12/2005 | Hilton et al. | |
| 2006/0075365 | A1 | 4/2006 | Hershenson et al. | |
| 2006/0101236 | A1 | 5/2006 | Han | |
| 2006/0123363 | A1 | 6/2006 | Williams et al. | |
| 2006/0151775 | A1 | 7/2006 | Hollenberg et al. | |
| 2006/0259283 | A1 | 11/2006 | Brughmans et al. | |
| 2007/0179760 | A1 | 8/2007 | Smith | |
| 2008/0052055 | A1 | 2/2008 | Rose et al. | |
| 2008/0085043 | A1 * | 4/2008 | Watanabe | G06T 7/149 |
| | | | | 382/131 |
| 2008/0238531 | A1 | 10/2008 | Harris | |
| 2008/0243735 | A1 * | 10/2008 | Rish | G06N 5/01 |
| | | | | 706/14 |
| 2008/0306903 | A1 * | 12/2008 | Larson | G06F 16/2462 |
| 2008/0313430 | A1 | 12/2008 | Bunyk | |
| 2008/0319964 | A1 | 12/2008 | Coury et al. | |
| 2009/0070402 | A1 | 3/2009 | Rose et al. | |
| 2009/0118970 | A1 | 5/2009 | Daum et al. | |
| 2011/0153254 | A1 * | 6/2011 | Hartov | A61B 5/064 |
| | | | | 702/103 |
| 2013/0067181 | A1 | 3/2013 | Boldyrev et al. | |
| 2014/0223224 | A1 * | 8/2014 | Berkley | G06N 10/00 |
| | | | | 714/10 |
| 2014/0297247 | A1 | 10/2014 | Troyer et al. | |
| 2015/0040107 | A1 * | 2/2015 | Iyer | G06F 30/327 |
| | | | | 717/131 |
| 2015/0269489 | A1 * | 9/2015 | Buhler | G06N 5/00 |
| | | | | 706/46 |
| 2016/0019267 | A1 * | 1/2016 | Kala | G06F 16/2465 |
| | | | | 707/754 |
| 2019/0095799 | A1 * | 3/2019 | Lidar | G06N 7/01 |
| 2019/0124530 | A1 | 4/2019 | McKibben | |
| 2019/0312800 | A1 * | 10/2019 | Schibler | H04L 41/0869 |
| 2020/0393798 | A1 * | 12/2020 | Kushibe | G06N 5/01 |
| 2021/0241866 | A1 * | 8/2021 | Bhattacharya | G06F 30/12 |

FOREIGN PATENT DOCUMENTS

| | | |
|---|---|---|
| WO | 2007085074 A1 | 8/2007 |
| WO | 2008138100 A1 | 11/2008 |
| WO | 2009120638 A2 | 10/2009 |

OTHER PUBLICATIONS

Kadin, et al., "Effects of Superconducting Return Currents on RSFQ Circuit Performance", IEEE Transactions on Applied Superconductivity, vol. 15 No. 2, Jun. 2, 2005, 4 pages.

Otsubo, et al., "Code-division multiple-access multiuser demodulator by using quantum fluctuations", Physical Review E 90, 012126 (2014), 16 pages.

Pinheiro, et al., "Magnetic flux avalanches in Nb/NbN thin films", Low Temp. Phys. 46, 365 (2020), 8 pages.

Raymond, et al., "Sparsely-Spread CDMA—a statistical mechanics based analysis.", PACS Nos. 64.60.cu, 75.10 Nr, 84.40.Ua, 89.70.+c.

Zhang, et al., "Quantum internet using code division multiple access", Scientific Reports, 3:2211, DOI: 10.1038/srep02211, 2013, 7 pages.

Baranwal, et al., "Distributed Optimization in Fixed-Time", arXiv:1905.10472vcs.SY] May 24, 2019, 14 pages.

Juan, et al., "Using Mutli-Start Randomized Heuristics to solve Non-Smooth and Non-Convex Optimization Problems", Conference on Numerical Optimization and Applications in Engineering, Oct. 12-15, 2010, 278 pages.

Mitra, et al., "Convergence and Finite-Time Behavior of Simulated Annealing", Memorandum No. UCB/ERL M85/23, Mar. 20, 1985.

Non-Final Office Action Issued in U.S. Appl. No. 16/936,742, mailed Oct. 25, 2023, 13 pages.

(56) References Cited

OTHER PUBLICATIONS

Strauss, "Forward and backward time observables for quantum evolution and quantum stochastic processes—I: The time observables", arXiv:0706.0268v1 [math-ph] Jun. 2, 2007, 26 pages.

Zeeshan, et al., "Meta-heuristic approach for the conceptual design and optimization of multistage interceptor", 18th World IMACS / MODSIM Congress, Cairns, Australia Jul. 13-17, 2009 http://mssanz.org.au/modsim09, 7 pages.

Mulligan, et al., "Designing Peptides on a Quantum Computer", bioRxiv preprint first posted online Sep. 2, 2019; doi: http://dx.doi.org/10.1101/752485, 20 pages.

Kasi, et al., "A Cost and Power Feasibility Analysis of Quantum Annealing for NextG Cellular Wireless Networks", arXiv:2109.01465v3 [cs.NI] Jan. 14, 2022, 14 pages.

Kasi, et al., "Towards Quantum Belief Propagation for LDPC Decoding in Wireless Networks", arXiv:2007.11069v2 [cs.NI] Sep. 19, 2020, 14 pages.

Kim, et al., "Physics-Inspired Heuristics for Soft MIMO Detection in 5G New Radio and Beyond", arXiv:2103.10561v1 [cs.NI] Mar. 18, 2021.

Raymond, et al., "Improving performance of logical qubits by parameter tuning and topology compensation", arXiv:2006.04913v2 [quant-ph] Aug. 6, 2020, 11 pages.

"Simulated Annealing" Microsoft Documents, https://docs.microsoft.com/en-us/azure/quantum/optimization-simulated-annealing#parameter-free-simulated-annealing-cpu, Feb. 1, 2021 (retrieved Jun. 22, 2021).

Bass, G. et al., "Heterogeneous Quantum Computing for Satellite Constellation Optimization: Solving the Weighted K-Clique Problem", arXiv:1709.05381v3, May 20, 2018. 17 pages.

Burton et al., "Event-Dependent Control of Noise Enhances Learning in Neural Networks," Neural Networks 5:627-637, 1992.

Castro, "Tightening Pieewise McCormick Relaxations for Bilinear Problems", Computers and Chemical Engineering 72 (2015) 300-311, Apr. 5, 2014.

Choi, Vicky. "Minor-embedding in adiabatic quantum computation: I. The parameter setting problem." arXiv:0804.4884v1. Apr. 30, 2008.

Cordella et al., "A (Sub)Graph Isomorphism Algorithm for Matching Large Graphs," IEEE Transactions on Pattern Analysis and Machine Intelligence 26(10):1367-1372, 2004.

Crainic et al., "Extreme Point-Based Heuristics for Three-Dimensional Bin Packing", CIRRELT, Oct. 2007. [Online]. Available: https://www.cirrelt.ca/documentstravail/cirrelt-2007-41.pdf.

Das et al., "Quantum Annealing and Analog Quantum Computation," arXiv:0801.2193v3, Mar. 24, 2008, 22 pages.

Dickson et al., "Thermally Assisted Quantum Annealing of a 16-Qubit Problem," Nature Communications, 2013, 6 pages.

Douglas et al., "Classical approach to the graph isomorphism problem using quantum walks," arXiv:0705.2531v2, Mar. 26, 2008, 22 pages.

Farhi et al., "Quantum Adiabatic Evolution Algorithms with Different Paths," arXiv:quant-ph/0208135v1, Aug. 21, 2002, 10 pages.

Finnila et al., "Quantum Annealing: A New Method for Minimizing Multidimensional Functions," arXiv:chem-ph/9404003v2, Jun. 3, 1994, 14 pages.

Fowler et al., "A Survey of Scheduling With Parallel Batch (p-batch) Processing", Eurpoean Journal of Operational Research 298 (2022) 1-24, Jun. 19, 2021.

Gaitan et al., "Graph isomorphism and adiabatic quantum computing," arXiv:1304.5773v2, Feb. 12, 2014, 22 pages.

Gonacalves et al., "A Biased Random Key Genetic Algorithm for 2D and 3D Bin Packing Problems", Int. J. Production Economics 145 (2013) 500-510, Apr. 18, 2013.

Harris et al., "A Compound Josephson Junction Coupler for Flux Qubits with Minimal Crosstalk," arXiv:0904.37841 [cond-mat.supr-con] Apr. 24, 2009, 4 pages.

Harris et al., "Sign and Magnitude Tunable Coupler for Superconducting Flux Qubits," arXiv:cond-mat/0608253v1 [cond-mat.supr-con], Aug. 11, 2006. 5 pages.

Hen et al., "Probing for Quantum Speedup In Spin Glass Problems with Planted Solutions", arXiv:1502.01663v3, Nov. 2, 2015.

Hen et al., "Solving the Graph Isomorphism Problem with a Quantum Annealer," arXiv:1207.1712v2, Aug. 8, 2012, 9 pages.

Johnson et al., "Quantum annealing with manufactured spins," Nature 473:194-198, May 12, 2011.

Johnson et al., "Supplementary Information: Quantum annealing with manufactured spins," Nature 473:s1-s20, May 12, 2011.

Kadowaki et al., "Quantum Annealing in the Transverse Ising Model," arXiv:cond-mat/9804280v1, Apr. 25, 1998, 23 pages.

Lu et al., "Imbalance in the Cloud: an Analysis on Alibaba Cluster Tree", 2017 IEEE International Conference on Big Data, 2017.

Lucas, "Ising formulations of many NP problems," Frontiers in Physics 2:Article 5, Feb. 12, 2014, 15 pages.

Maasen van den Brink et al., "Mediated Tunable Coupling of Flux Qubits," New Journal of Physics 7(230) 2005, 19 pages.

Makhlin et al., "Quantum-state engineering with Josephson-junction devices," arXlv:cond-mat/0011269v1, Nov. 15, 2000 Reviews of Modern Physics 73(2):357-400, Apr. 2001.

Maryak et al., "Efficient Global Optimization Using SPSA," Proceedings of the American Control Conference, San Diego, California, Jun. 1999, 5 pages.

Morita, "Faster Annealing Schedules for Quantum Annealing," Journal of the Physical Society of Japan 76(10): Article 104001, Oct. 2007, 4 pages.

Nielsen et al., "7.8 Other implementation schemes," in Quantum Computation and Quantum Information, 1st ed., Cambridge University Press, Cambridge, 2000, pp. 343-345.

Paquay, "A Mixed Integer Programming Formulation for the Three Dimensional Bin Packing Problem Deriving from an Air Cargo Application", Jun. 3, 2014.

Pfau et al., "Connecting Generative Adversarial Networks and Actor-Critic Methods", arXiv:1610.01945v3, Jan. 18, 2017.

Rujan, P., "Searching for Optimal Configurations by Simulated Tunneling," Z. Phys. B—Condensed Matter, 73:391-416, 1988.

Ullman, "An Algorithm for Subgraph Isomorphism," Journal of the Association for Computing Machinery 23(1):31-42, Jan. 1976.

Van Dongen et al., "Metric Distances Derived from Cosine Similarity and Pearson and Spearman Correlations", arXiv:1208.3145v1, Aug. 14, 2012.

Venturelli et al., "Quantum Annealing Implementation of Job-Shop Scheduling," arXiv:1506.08479v1 [quant-ph] Jun. 29, 2015, 16 pages.

Vinci et al., "Hearing the Shape of the Ising Model with a Programmable Superconducting-Flux Annealer," arXiv:1307.1114v2, Sep. 17, 2014, 13 pages.

Wang et al., "Research and Implementation of Scheduling Strategy in Kubernetes for Computer Science Laboratory in Universities", Information 2021. [Online]. Available: https://doi.org/10.3390/info12010016.

Wikipedia, "K-d tree", Oct. 13, 2022.

Gallop, et al., "SQUIDs and their applications," Journal of Physics E: Scientific Instruments 9(6):417-429, 1976.

Ibrahim, Zuwairie, "Solving Unconstraint Assignment Problem by a Molecular-Based Computing Algorithm", IEEE, 2004 (Year: 2004).

Kleiner, et al., "Superconducting Quantum Interference Devices: State of the Art and Applications," Proceedings of the IEEE 92(10): 1534-1548, 2004.

Teller, Carston, "Functional nucleic acid nanostructures and DNA machines", Science Direct, 2010 (Year: 2010).

Zhu, Zheng, et al., "Efficient Cluster Algorithm for Spin Glasses in Any Space Dimension", arXiv:1501.05630v2 [cond-mat.dis-nn] Aug. 15, 2015, 5 pages.

Feld., "A Hybrid Solution Method for the Capacitated Vehicle Routing Problem Using a Quantum Annealer", Frontiers in ICT, Jun. 2019, vol. 6 Article 13, 13 pages.

Goodfellow et al., "Generative Adversarial Nets", arXiv:1406.2661v1 [stat.ML], 9 pages, Jun. 10, 2014.

Syrichas, et al.., "Large-scale vehicle routing problems: Quantum Annealing, tunings and results", Computers and Operations Research 87 (2017) 52-62.

(56) References Cited

OTHER PUBLICATIONS

Amin et al., "Thermally assisted adiabatic quantum computation," arXiv:cond-mat/0609332v2, pp. 1-5, (Mar. 2, 2007) Feb. 1, 2008.
Bian et al., "Discrete optimization using quantum annealing on sparse lsing models", Frontiers in Physics, Sep. 18, 2014.
"A High-Level Look at Optimization: Past, Present and Future," e-Optimization.Community, May 2000, pp. 1-5.
Aghael, "A Hybrid Algorithm For Finding Shortest Path in Network Routing" (2005).
Ahmad, "5G Technology: Towards Dynamic Spectrum Sharing Using Cognitive Radio Networks" (2020).
Aji, "The Generalized Distributive Law and Free Energy Minimization" 2000.
Amin et al., "First Order Quantum Phase Transition in Adiabatic Quantum Computation", arXiv:0904.1387v3, Dec. 15, 2009, 5 pages.
Amin et al., "Thermally assisted adiabatic quantum computation," arXiv:cond-mat/0609332v2, pp. 1-5, (Mar. 2, 2007) Feb. 1, 2006.
Amin, "Effect of Local Minima on Adiabatic Quantum Optimization," arXiv:0709.0528v2, Apr. 4, 2008.
Bian, et al., "Discrete optimization using quantum annealing on sparse Ising models", Frontiers in Physics, Sep. 18, 2014.
Bian, et al., "Mapping constrained optimization problems to quantum annealing with application to fault diagnosis", arXiv:1603.03111v1 [quant-ph] Mar. 10, 2016, 22 pages.
Booth, M. et al., "Partitioning Optimization Problems for Hybrid Classical/Quantum Execution," D-Wave Technical Report, Jan. 9, 2017, 13 pages.
Boros, et al., "Local search heuristics for Quadratic Unconstrained Binary Optimization (QUBO)", Rutcor Research Report, Feb. 2005.
Boros, et al., "Pseudo-Boolean optimization", Elsevier, Discrete Applied Mathematics, 123 (2002) 155-225.
Borzsonyi, et al., "The Skyline Operator" 2001.
Burges, "Factoring as Optimization", 2002.
Codato, et al., "Combinatorial Benders' Cuts for Mixed-Integer Linear Programming", Operations Research, 54(4): 756-766, 2006.
Crowley, et al., "Quantum and Classical in Adiabatic Computation", rXiv:1405.5185v1 [quant-ph] May 20, 2014, 9 pages.
DelaFuente Ruiz, "Quantum annealing", http://www.linkedin.com/in/alfonsofr, 2014, 21 pages.
Dolan , et al., "Optimization on the NEOS Server," from SIAM News 35(6): 1-5, Jul./Aug. 2002.
Douglass, et al., "Constructing SAT Filters with a Quantum Annealer, Theory and Applications of Satisfiability Testing—SAT 2015: 18th International Conference", Austin, TX, Sep. 24-27, 2015, Proceedings, pp. 104-120. Springer International Publishing.
Duchi, "Using Combinatorial Optimization Within Max-Producet Belief Propagation" 2007.
D-Wave Network Maximum Independent Set 2020.
Farhi et al., "A quantum adiabatic evolution algorithm applied to random instances of an NP-Complete problem", arXiv: quant-ph/0104129v1 Apr. 26, 2001.
Farhi et al., "Quantum Adiabatic Evolution Algorithms versus Simulated Annealing," MIT-CTP #3228, arXiv:quant-ph/0201031v1, pp. 1-16, Jan. 8, 2002.
Fourer, et al., "Optimization as an Internet Resource," Interfaces 31(2): 130-150, Mar.-Apr. 2001.
Hafenrichter, et al., "Optimization of Relational Preference Queries" 2005.
Hao, et al, "Multiple Simulated Annealing-Molecular Dynamics for Conformational Space Search of Peptide and Miniprotein", Nature.com/scientific reports, DOI: 10.1038/srep15568, 2015, 10 pages.
Harris, et al., "Sign and Magnitude Tunable Coupler for Superconducting Flux Qubits", arXiv:cond-mat/0608253v1, Aug. 11, 2006 2006.
Bian , et al., "The Ising Model: teaching an old problem new tricks", D-wave systems. 2 (year 2010), 32 pages.
Dickson, Neil G, et al., "Algorithmic approach to adiabitic quantum optimization", Physical Review A, arXiv:1108.3303v1 [puant-ph] Aug. 16, 2011, 7 pages.
Farhi, Edward , et al., "Quantum Adiabatic Algorithms, Small Gaps, and Different Paths", Physical Review E, arXiv:0909.4766v2 [quant-ph], Jun. 4, 2010, 45 pages.
Hooker et al., "Logic-based Benders Decomposition. Mathematical Programing", 96:33-60, Apr. 2003.
Huang, "Cooperative Optimization for Energy Minimization: A Case Study of Stereo Matching" 2007.
Huang, "Deriving the Normalized Min-Sum Algorithm From Cooperative Optimization" 2006.
King, Benchmarking a Quantum Annealing Processor With the Time-to-Target Metric 2015.
King, et al., "Quantum Annealing Amid Local Ruggedness and Global Frustration" 2017.
Knysh, et al., "Quantum Adiabatic Evolution Algorithm and Quantum Phase Transition in 3-Satisfiability Problem" 2006.
Kochenberger, et al., "A Unified Modeling and Solution Framework for Combinatorial Optimization Problems" 2004.
Kowowski, et al., "Classical Coloring of Graphs" 2004.
Kubalik, "Solving the Sorting Network Problem Using Iterative Optimization with Evolved Hypermutations" 2009.
Laskari, et al. "Problems of Cryptography as Discrete Optimization Tasks" 2005.
Maischberger, "COIN-OR METSlib a Metaheuristics Framework in Modern C++" 2011.
Morita, et al., "Quantum-thermal annealing with cluster-flip algorithm", arXiv:0903.2206v2 [cond-mat.dis-nn] Jun. 8, 2009, 4 pages.
Muller, et al., "Faster Min-Max Resource Sharing in Theory and Practice", Mathematical Programming Computation, 3(1):1-35, 2011.
Nesterov, "Primal-dual Subgradient Method for Convex Problems" 2009.
Pakzad, et al., "Estimation and Marginalization Using Kikuchi Approximation Methods" 2003.
Preisinger, et al., "The BNL++ Algorithm for Evaluation Pareto Preference Queries" 2006.
Rei, et al., "Accelerating Benders Decomposition by Local Branching". Informs Journal on Computing, 21(2):333-345, Spring 2009.
Steffen, et al., "Experimental Implementation of an Adiabatic Quantum Optimization", Physical Review Letters, vol. 90, No. 6. Feb. 14, 2003, 4 pages.
Suzuki et al., "Quantum Ferromagnetic Annealing," Physica E: Low-Dimensional Systems and Nanostructures, 40(2):367-370, Dec. 2007.
Tanaka, et al., "Hybrid Quantum Anneal for Clustering Problems", arXiv:1104.3246v1 [cond-mat.dis-nn] Apr. 16, 2011, 24 pages.
VanDenBrink, "Mediated Tunable Coupling of Flux Qubits", New Journal of Physics 7 (2005) 230, Nov. 7, 2005.
Vinci, et al., "Distinguishing Classical and Quantum Models for the D-Wave Device", arXiv:1403.4228v1 [quant-ph] Mar. 17, 2014, 29 pages.
Wu, The Theory and Applications of Discrete Constrained Optimization Using Lagrance Multipliers 2000.
Xu, et al., "Multicanonical Jump Walk Annealing: An Efficient Method for Geometric Optimization", Journal of Chemical Physics, vol. 112, No. 6, Feb. 8, 2000.
Yedida, et al., "Message-Passing Algorithms for Inference and Optimization", Journal of Statistical Physics, 145(4):860-890, 2011.
Yedidia, et al., "Constructing Free Energy Approximations and Generalized Belief Propagation Algorithms" 2002.
Zhang, "Discovering Strong Skyline Points in High Dimensional Spaces" 2005.
Zhu, et al., "Efficient Cluster Algorithms For Spin Glasses in Any Space Dimension", arXiv:1501.05630v2 [cond-mat. dis-nn] Aug. 15, 2015.
Zick et al., "Experimental Quantum Annealing: Case Study Involving the Graph Isomorphism Problem" 2015.
Kurihara, et al. "Quantum Annealing for Clustering", arXiv:0905.3527v2 [cond-mat.dis-nn], May 28, 2009, pp. 1-9.
Ronnow, et al., "Defining and detecting quantum speedup", arXiv:1401.2910v1 [quant-ph] Jan. 13, 2014, 15 pages.

\* cited by examiner

SYSTEMS AND METHODS FOR HEURISTIC ALGORITHMS WITH VARIABLE EFFORT PARAMETERS

FIELD

This disclosure generally relates to system and methods for executing heuristic algorithm with variable effort parameters.

BACKGROUND

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and $A(t)$, $B(t)$ are coefficients that can control the rate of evolution, and typically lie in the range [0,1].

In some implementations, a time varying envelope function can be placed on the problem Hamiltonian. A suitable delocalization Hamiltonian is given by:

$$H_D \propto -\frac{1}{2}\sum_{i=1}^{N}\Delta_i \sigma_i^x$$

where N represents the number of qubits, $\sigma_i^x$ is the Pauli x-matrix for the ith qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$.

Here, the $\sigma_i^z$ and $\sigma_i^z \sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Sampling

Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population, i.e., a selection of data taken from a statistical population. Sampling is the process of taking the sample, and typically follows a defined procedure. For example, in a population, database, or collection of objects, a sample may refer to an individual datum, data point, object, or subset of data, data points, and/or objects.

In electrical engineering and related disciplines, sampling relates to taking a set of measurements of an analog signal or some other physical system. Sampling may include conversion of a continuous signal to a discrete signal.

In many fields, including simulations of physical systems, and computing, especially analog computing, the foregoing meanings may merge. For example, a hybrid computer can draw samples from an analog computer. The analog computer, as a provider of samples, is an example of a sample generator. The analog computer can be operated to provide samples from a selected probability distribution, the probability distribution assigning a respective probability of being sampled to each data point in the population.

An analog processor, for example a quantum processor and in particular a quantum processor designed to perform quantum annealing and/or adiabatic quantum computation, may be operated as a sample generator. The population can correspond to all possible states of the processor, and each sample can correspond to a respective state of the processor. Using an analog processor as a sample generator may be a preferred mode of operating the processor for certain applications. Operating an analog processor as a sample generator may also enable a broader range of problems to be solved compared to, for example, using an analog processor to find a low energy state of a Hamiltonian that encodes an optimization problem.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

A method of operating of computing system for solving a computational problem using a heuristic algorithm is described. The heuristic algorithm has at least one time-like parameter and a running time. The method is being performed by a digital processor and comprises: initializing a value of the at least one time-like parameter to a first value; iteratively, until a running time of the heuristic algorithm reaches a time-limit value: determining whether an evaluation criterion has been met; in response to determining that the evaluation criterion has been met: setting the value of the at least one time-like parameter to a second value, the second value larger than the first value; running the heuristic algorithm with the second value of the at least one time-like parameter to generate a first set of solutions to the computational problem; in response to determining that the evaluation criterion has not been met: setting the value of the at least one time-like parameter to a third value, the third value smaller than the first value;

running the heuristic algorithm with the third value of the at least one time-like parameter to generate a second set of solutions to the computational problem; and; returning the first and the second set of solutions to the computational problem. The method may further comprise setting a value of an effort multiplier, wherein the value of the effort multiplier is greater than one, setting a value of a time-limit, and may include determining whether a value of the running time is smaller than the value of the time-limit divided by the value of the effort multiplier. The heuristic algorithm may be at least one of: Simulated Annealing or Parallel Tempering. The at least one time-like parameter may be at least one of: number of updates to perform, number of samples to take and number of replicas. The second value may be the first value multiplied by the value of the effort multiplier. The third value may be the first value divided by the effort multiplier. The method may further comprise initializing a value of a time per effort factor; and the third value may be (time_limit−time_so_far)/time_per_effort/effort_mulitplier, wherein time_limit is the running time, time_so_far is a value of the running time, and time_per_effort is the value of the time per effort factor. The heuristic algorithm may run on a quantum processor communicatively coupled to the digital processor and the heuristic algorithm may be at least one of: a Quantum Annealing algorithm and a Quantum Approximate Optimization Algorithm.

A system for solving a computational problem is described. The system comprises: at least one non-transitory processor-readable medium that stores at least one of processor executable instructions and data; and at least one processor communicatively coupled to the least one non-transitory processor-readable medium, which, in response to execution of the at least one of processor executable instructions and data performs the method described above. The system may further comprise a quantum processor, communicatively coupled to the at least one processor, and the at least processor instructs the quantum processor to perform the heuristic algorithm. The quantum processor may be a quantum annealing processor and the heuristic algorithm may be a Quantum Annealing algorithm. The quantum processor may be a gate model quantum processor and the heuristic algorithm may be a Quantum Approximate Optimization Algorithm.

A method of operation of a computing system for solving a computational problem using a heuristic algorithm is described. The heuristic algorithm has at least one time-like parameter. The method is being performed by a processor in the computing system and comprises: initializing the at least one time-like parameter to a current value; executing the algorithm with the current value of the time-like parameter, thereby obtaining a set of solutions; iteratively, until a termination condition has been met: executing the algorithm with the current value of the time-like parameter, thereby obtaining additional respective sets of solutions; evaluating a first evaluation criterion; in response to determining that the first evaluation criterion has been met: decreasing the current value of the at least one time-like parameter; in response to determining that the first evaluation criterion has not been met: comparing energies over the set of solutions obtained with the current value of the at least one time-like parameter and the decreased value of the at least one time-like parameter; evaluating a second evaluation criterion; in response to determining that the second evaluation criterion has been met: decreasing the current value of the at least one time-like parameter; in response to determining that the second evaluation criterion has not been met: evaluating a third evaluation criterion; in response to determining that the third evaluation criterion has been met: increasing the current value of the at least one time-like parameter; in response to determining that the third evaluation criterion has not been met: comparing energies over the set of solutions obtained with the current value of the at least one time-like parameter and the increased value of the at least one time-like parameter; evaluating a fourth evaluation criterion; and in response to determining that the fourth evaluation criterion has been met: increasing the current value of the at least one time-like parameter. The method may further comprise initializing a value of a target energy and a value of a threshold time, and the termination condition may be at least one of: a running time of the algorithm exceeding a threshold time and an energy of a current set of solutions being smaller than a target energy. The algorithm may be at least one of: Simulated Annealing and Parallel Tempering. The at least one time-like parameter may be at least one of: number of updates and number of reads. The algorithm may execute on a quantum processor communicatively coupled to the digital processor and may be at least one of: Quantum Annealing and Quantum Approximate Optimization Algorithm. The at least one time-like parameter may be at least one of: annealing time, circuit depth and number of gate operations. Initializing the at least one time-like parameter to a current value may include initializing the at least one time-like parameter to a minimum value and evaluating a first evaluation criterion may include evaluating whether the current value of the at least one time-like parameter is greater than the minimum value of the at least one time-like parameter and whether a time of execution of the heuristic algorithm with the current value of the time-like parameter is not smaller by a factor then a time of execution of the heuristic algorithm with a decreased value of the time-like parameter. The method may further comprise, in response to determining that the current value of the at least one time-like parameter is not greater than the minimum value, evaluating the third evaluation criterion. Decreasing the current value of the at least one time-like parameter may include decreasing the current value of the at least one time-like parameter by half. Evaluating a second evaluation criterion may include evaluating whether an energy of the set of solutions obtained with the current value of the time-like parameter is greater than an energy of the set of solutions obtained with the decreased value of the at least one time-like parameter. Evaluating a third evaluation criterion may include evaluating whether a number of iterations of the heuristic algorithm is greater than one and a time of execution of the heuristic algorithm with the current value of the time-like parameter is not smaller by a factor then a time of execution of the heuristic algorithm with an increased value of the time-like parameter. Increasing the current value of the at least one time-like parameter may include multiplying the current value of the at least one time-like parameter by two. Evaluating a fourth evaluation criterion may include evaluating whether an energy of the set of solutions obtained with the current value of the time-like parameter is smaller than an energy of the set of solutions obtained with the increased value of the at least one time-like parameter.

A system for solving a computational problem is described. The system may comprise: at least one non-transitory processor-readable medium that stores at least one of processor executable instructions and data; and at least one processor communicatively coupled to the least one non-transitory processor-readable medium, which, in response to execution of the at least one of processor executable instructions and data performs the method described above. The system may further comprise a quantum processor, communicatively coupled to the at least one processor, and wherein, during execution of the method described above, the at least processor instructs the quantum processor to perform the heuristic algorithm. The quantum processor may be a quantum annealing processor and the heuristic algorithm may a Quantum Annealing algorithm. The quantum processor may be a gate model quantum processor and the heuristic algorithm may be a Quantum Approximate Optimization Algorithm.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Hybrid Computing System

Figure 1:
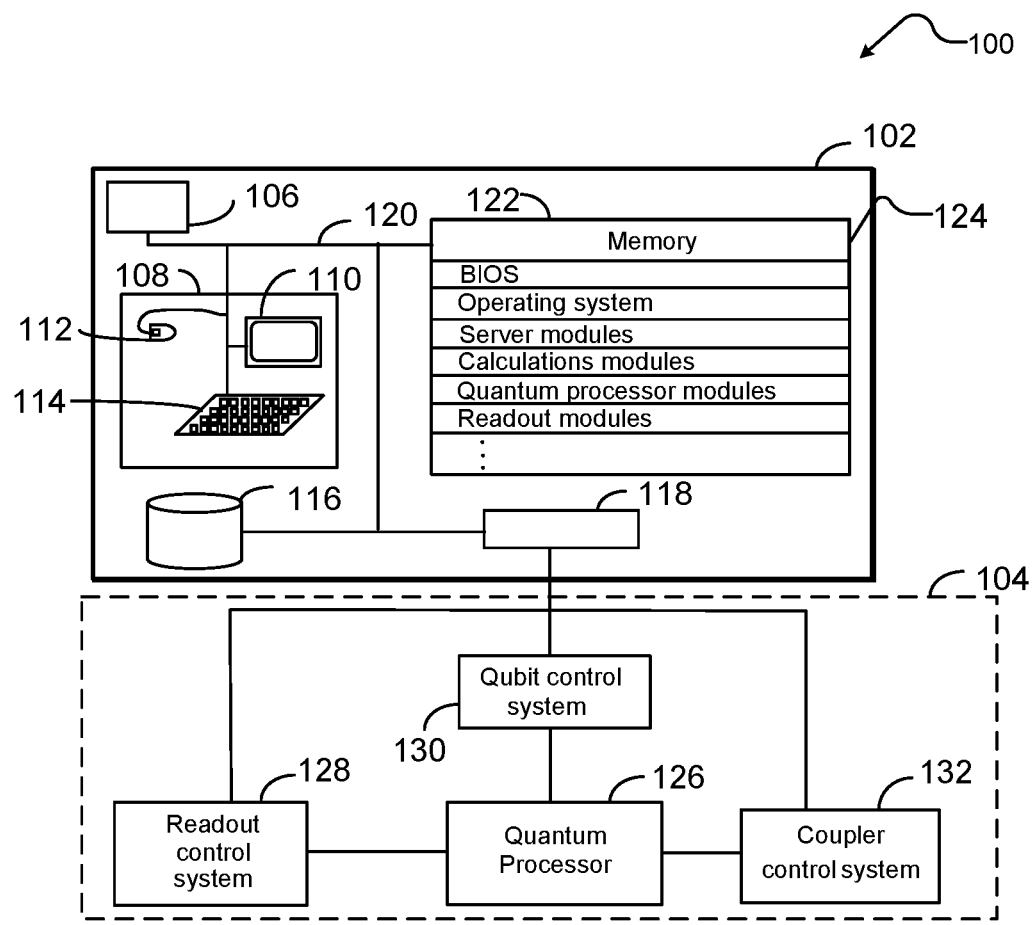
FIG. 1 is a schematic diagram of a hybrid computing system including a digital computer coupled to an analog computer, in accordance with the present systems, devices, and methods.

FIG. 1 illustrates a computing system 100 comprising a digital computer 102. The example digital computer 102 includes one or more digital processors 106 that may be used to perform classical digital processing tasks. Digital computer 102 may further include at least one system memory 122, and at least one system bus 120 that couples various system components, including system memory 122 to digital processor(s) 106. System memory 122 may store one or more sets of processor-executable instructions, which may be referred to as modules 124.

The digital processor(s) 106 may be any logic processing unit or circuitry (for example, integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 126. Quantum processor 126 may include at least one superconducting integrated circuit. Digital computer 102 may communicate with analog computer 104 via, for instance, a controller 118. Certain computations may be performed by analog computer 104 at the instruction of digital computer 102, as described in greater detail herein.

Digital computer 102 may include a user input/output subsystem 108. In some implementations, the user input/output subsystem includes one or more user input/output components such as a display 110, mouse 112, and/or keyboard 114.

System bus 120 may employ any known bus structures or architectures, including a memory bus with a memory controller, a peripheral bus, and a local bus. System memory 122 may include non-volatile memory, such as read-only memory ("ROM"), static random-access memory ("SRAM"), Flash NAND; and volatile memory such as random-access memory ("RAM") (not shown).

Digital computer 102 may also include other non-transitory computer- or processor-readable storage media or non-volatile memory 116. Non-volatile memory 116 may take a variety of forms, including: a hard disk drive for reading from and writing to a hard disk (for example, a magnetic disk), an optical disk drive for reading from and writing to removable optical disks, and/or a solid state drive (SSD) for reading from and writing to solid state media (for example NAND-based Flash memory). Non-volatile memory 116 may communicate with digital processor(s) via system bus 120 and may include appropriate interfaces or controllers 118 coupled to system bus 120. Non-volatile memory 116 may serve as long-term storage for processor- or computer-readable instructions, data structures, or other data (sometimes called program modules or modules 124) for digital computer 102.

Although digital computer 102 has been described as employing hard disks, optical disks and/or solid-state storage media, those skilled in the relevant art will appreciate that other types of nontransitory and non-volatile computer-readable media may be employed. Those skilled in the relevant art will appreciate that some computer architectures employ nontransitory volatile memory and nontransitory non-volatile memory. For example, data in volatile memory may be cached to non-volatile memory or a solid-state disk that employs integrated circuits to provide non-volatile memory.

Various processor- or computer-readable and/or executable instructions, data structures, or other data may be stored in system memory 122. For example, system memory 122 may store instructions for communicating with remote clients and scheduling use of resources including resources on the digital computer 102 and analog computer 104. Also, for example, system memory 122 may store at least one of processor executable instructions or data that, when executed by at least one processor, causes the at least one processor to execute the various algorithms to execute instructions. In some implementations system memory 122 may store processor- or computer-readable calculation instructions and/or data to perform pre-processing, co-processing, and post-processing to analog computer 104. System memory 122 may store a set of analog computer interface instructions to interact with analog computer 104. For example, the system memory 122 may store processor- or computer-readable instructions, data structures, or other data which, when executed by a processor or computer causes the processor(s) or computer(s) to execute one, more or all of the acts of the methods 200 (FIG. 2) and 300 (FIG. 3).

Analog computer 104 may include at least one analog processor such as quantum processor 126. Analog computer 104 may be provided in an isolated environment, for example, in an isolated environment that shields the internal elements of the quantum computer from heat, magnetic field, and other external noise. The isolated environment may include a refrigerator, for instance a dilution refrigerator, operable to cryogenically cool the analog processor, for example to temperature below approximately 1 K.

Analog computer 104 may include programmable elements such as qubits, couplers, and other devices (also referred to herein as controllable devices). Qubits may be read out via readout system 128. Readout results may be sent to other computer- or processor-readable instructions of digital computer 102. Qubits may be controlled via a qubit control system 130. Qubit control system 130 may include on-chip Digital to Analog Converters (DACs) and analog lines that are operable to apply a bias to a target device. Couplers that couple qubits may be controlled via a coupler control system 132. Coupler control system 132 may include tuning elements such as on-chip DACs and analog lines. Qubit control system 130 and coupler control system 132 may be used to implement a quantum annealing schedule as described herein on quantum processor 126. Programmable elements may be included in quantum processor 126 in the form of an integrated circuit. Qubits and couplers may be positioned in layers of the integrated circuit that comprise a first material. Other devices, such as readout control system 128, may be positioned in other layers of the integrated circuit that comprise a second material. In accordance with the present disclosure, a quantum processor, such as quantum processor 126, may be designed to perform quantum annealing and/or adiabatic quantum computation. Examples of quantum processors are described in U.S. Pat. No. 7,533,068.

Time-Based Effort-Based Algorithm

Many heuristic optimization algorithms, for example methods based on iterative local search whether via local physical dynamics (e.g., Quantum Annealing, or Thermal Annealing) or 'Markov chain' methods (e.g., Simulated Annealing, Tabu, Parallel Tempering etc.), operate with time as a free parameter, and are guaranteed good solutions only in the long time limit. However, in many situations where time is a limited resource, it is desirable to run a heuristic algorithm for a fixed amount of time and obtain a good solution to a problem.

For example, an algorithm like Simulated Annealing has several time-like parameters that influence the run time of the algorithms. In the present disclosure and the appended claims, the term 'time-like parameter' or 'time-like parameters' is used to describe an algorithm's parameters or settings that specify the amount of computational work (or effort) performed, and contribute to the length of time the algorithm needs to run in order to return a solution. In the present disclosure and the appended claims, the terms 'time-like parameter' will not be used as a reference to 'time' and/or 'number of iterations'. It may therefore be advantageous to select values of the time-like parameters to produce good solutions in a fixed amount of time.

The time it takes Simulated Annealing to return an optimal solution to a given problem depends on: the number of weights in the problem, the problem hardness, the number of updates to perform, the number of samples to take and the temperature schedule. However, typically for a given problem to be solved with Simulated Annealing, the number of weights and the problem hardness depends on the given problem and are therefore fixed for the specific problem instance. The temperature schedule is typically tuned based on the problem weights. Two time-like parameters, number of updates and number of samples, can be optimized to produce a good solution in a fixed amount of time. Other algorithms may have different time-like parameters that can be selected to produce good solutions in a fixed amount of time. For example, in Parallel Tempering the number of replicas is a time-like parameter.

Several techniques can be used to run a heuristic algorithm in a fixed amount of time. For example, the algorithm can be executed multiple times with different values of the time-like parameter(s), resulting in different length of execution, and the execution with the desired time duration can be selected. However, this technique requires running the algorithm multiple times while searching for a value of the time-like parameters that produces the desired time duration. This may result in more time utilized to search for the optimal parameters than to run the algorithm for the desired time.

Alternatively, a calibration run of the algorithm may be performed to give a prediction on the average time-per-effort. The calibration run may involve taking a representative model or set of models, and testing a representative range of time-like parameters, and the associated relationship with time can be inferred. Then the algorithm may be run with a value of the time-like parameter equal to the desired run time divided by the time per effort. However, the prediction of the time-per-effort may be incorrect, given that while the run time is typically monotonic with respect to the time-like parameters, the relationship may not be linear (or even smooth) and it is problem specific, e.g., can fluctuate strongly between problem instances; even those defined with common bulk parameters such as number of variables and weights. Therefore, more complicated modeling, requiring previous knowledge of the problem time-effort relationship, may be needed.

Another alternative is to select a small value of the time-like parameter and perform as many runs of the algorithm as possible in a desired time frame. This alternative requires a large number of restarts, increasing the overhead and reducing the time utilized to execute the algorithm. In addition, typically the solution quality of a heuristic algorithm increases with the effort size, therefore it may be more advantageous to perform fewer runs of the algorithm with a larger value of the time-like parameters.

It may therefore be advantageous to select values of the time-like parameters and continuously adjust those values during the execution of the heuristic optimization routine, with the goal of increasing or maximizing effort while keeping the execution time close to the desired time. The present disclosure describes methods to run a heuristic algorithm wrapped in a meta-algorithm. The meta-algorithm will perform multiple sub-runs of the algorithm within a fixed time frame and increase or decrease the value of the time-like parameters based on the heuristic algorithm time within the fixed time frame. The meta-algorithm will use the largest effort possible to increase the probability of finding good solutions to the problem, while remaining within the fixed time frame. The meta-algorithm may be advantageous to use with heuristic solvers in time-constrained scenarios, such as, for example, the MQLib benchmarks or Vehicle Routing Problem applications.

Figure 2:
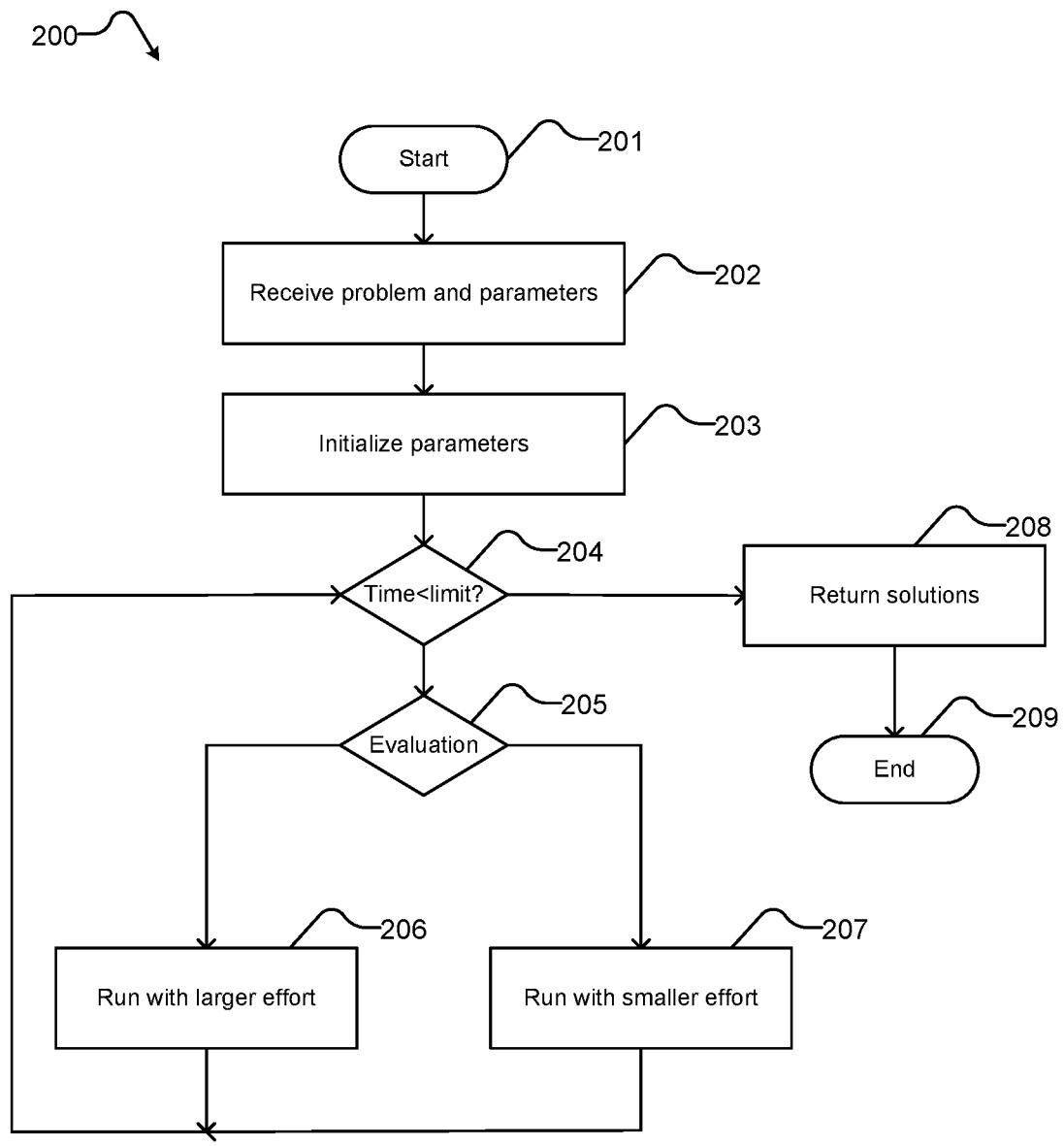
FIG. 2 is a flowchart of an example method for time-based and effort-based algorithm according to one aspect of the disclosure.
Figure 3:
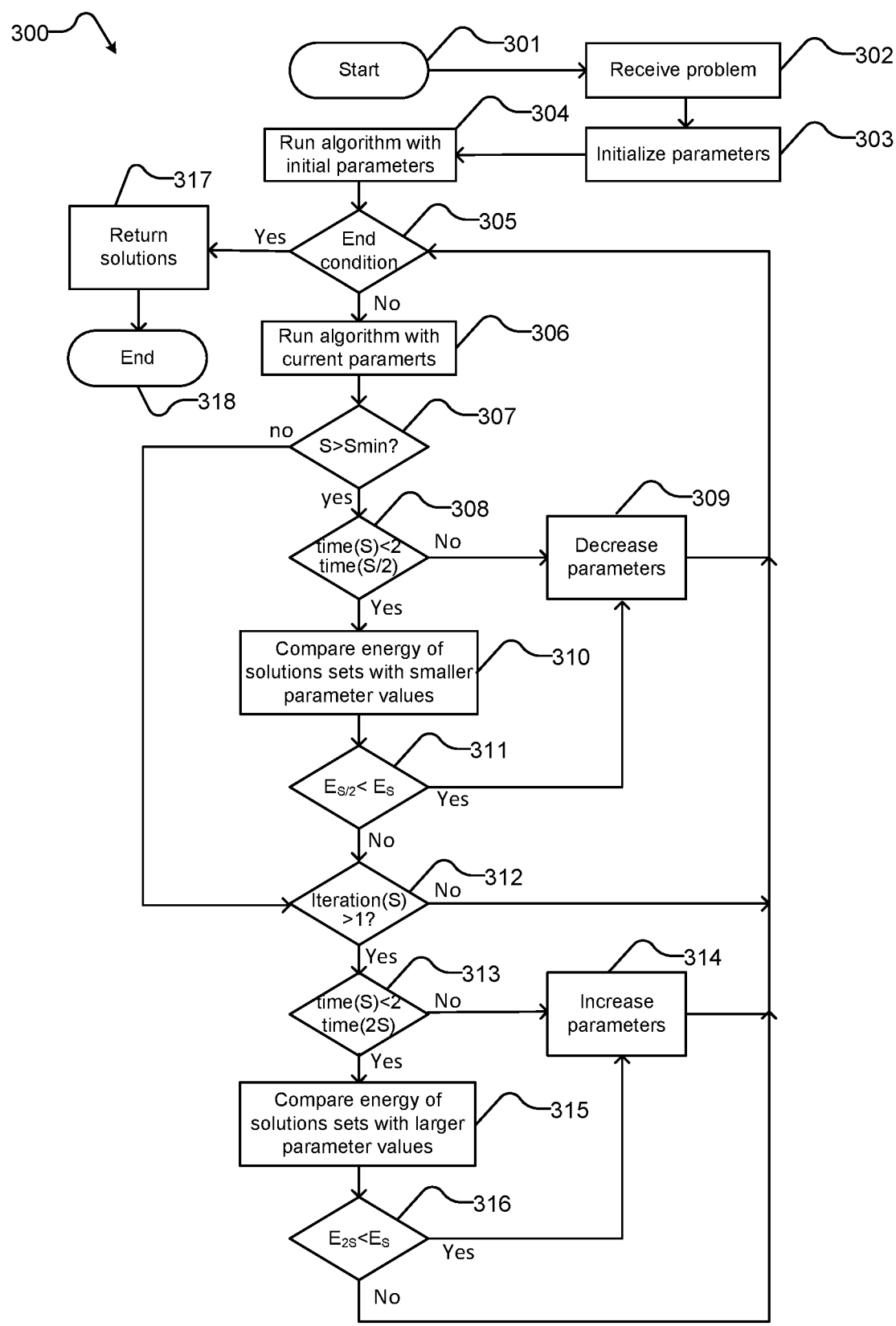
FIG. 3 is a flowchart of an example method for executing heuristic algorithm with a variable time-like effort.

FIG. 2 is a flowchart of an example method 200 to execute a time-based and effort-based meta-algorithm according to one aspect of the disclosure. Method 200 may be used by a computing system, including a hybrid computing system similar to computing system 100, and executed by a processor, for example digital processor 106. Method 200 may be used for solving computational problems via a heuristic algorithm where it is desirable for the heuristic algorithm to provide a solution within a fixed time frame. The heuristic algorithm may be executed on quantum processor 126 of computing system 100, for example a quantum annealing algorithm may be executed, where the time-like parameter is the annealing time. In at least one implementation, quantum processor 126 may be a gate model quantum processor and digital computer 102 causes a Quantum Approximate Optimization Algorithm (QAOA) to be executed on quantum processor 126, where the time-like parameter may be circuit depth or the number of gate operations.

Method 200 comprises acts 201 to 209; however, a person skilled in the art will understand that the number of acts is an example, and, in some implementations, certain acts may be omitted, further acts may be added, and/or the order of the acts may be changed.

Method 200 starts at 201, for example in response to a call from another routine.

At 202, the digital processor receives a computational problem and the associated parameters, to be solved via a heuristic algorithm. The heuristic algorithm may be, for example a Simulated Annealing algorithm and the parameters associated with the problem may include problem hardness, number of weights and temperature schedule. In some implementations, the heuristic algorithm is a Quantum Annealing algorithm or a QAOA.

At 203 the digital processor initializes the parameters of the meta-algorithm. Parameters of the meta-algorithm may include the time limit, an effort multiplier parameter, and an initial value of the time-like parameter. Time-like parameters may include the number of updates and the number of samples in a Simulated Annealing algorithm.

At 204 the digital processor evaluates whether the running time since the start of the execution of the heuristic algorithm is smaller than the time limit initialized at 203. During a first iteration of method 200, before the start of the execution of the heuristic algorithm (act 206 and/or 207), the condition is met. If the condition is met, method 200 proceeds to act 205, otherwise to act 208.

At 205, the digital processor determines whether an evaluation criterion has been met. In some implementations, an evaluation criterion may be the running time since the start of the execution of the heuristic algorithm being smaller than then the time limit divided by the effort multiplier (i.e., time-so-far<(time-limit/effort-multiplier)). During a first iteration of method 200, before the start of the execution of the heuristic algorithm (act 206 and/or 207), the condition is met. If the evaluation criterion has been met, method 200 proceeds to 206, otherwise to 207.

At 206, the digital processor executes the heuristic algorithm with a larger value of the time-like parameter(s). For example, the value of the time-like parameter(s) may be increased by the value of the effort multiplier. In some implementations, the time-like parameter is multiplied by the effort multiplier, i.e., time-like parameter=time-like parameter*effort-multiplier. Consequently, the heuristic algorithm may run for longer time, and with increased effort, compared to the previous initialization of the time-like parameter(s). In some implementations, a quantum processor communicatively coupled to the digital processor, for example quantum processor 126 of computing system 100, executes the heuristic algorithm with the larger value of the time-like parameter(s). In some implementations, the heuristic algorithm is a Quantum Annealing algorithm or a QAOA. Method 200 then proceeds to 204, where the time limit condition is evaluated again.

At 207, the digital processor executes the heuristic algorithm with a smaller value time-like parameter(s). For example, the value of the time-like parameter(s) may be decreased by the value of the effort multiplier. In at least one implementation, the time-like parameter is divided by the effort multiplier, i.e., time-like parameter=time-like parameter/effort-multiplier. In another implementation, the time-like parameter is set to the remaining running time, divided by the time-per-effort factor, divided by the effort multiplier, where the time-per-effort factor is the latest sub-run time divided by its associated value of the time-like parameter, i.e., time-like parameter=(time_limit–time_so_far)/time_per_effort/effort-multiplier. Consequently, the heuristic algorithm may run for shorter time, and with smaller effort, compared to the previous initialization of the time-like parameter(s). In some implementations, a quantum processor communicatively coupled to the digital processor, for example quantum processor 126 of computing system 100, executes the heuristic algorithm with the smaller value of the time-like parameter(s). In at least one implementation, the heuristic algorithm is a Quantum Annealing algorithm or a QAOA. Method 200 then proceeds to 204, where the time limit condition is evaluated again.

At 208, the digital processor returns the set of solutions from the heuristic algorithm, for example Simulated Annealing, executed at 206 and 207.

At 209, method 200 terminates, until it is, for example invoked again.

Non-Parametric Methods for a Heuristic Optimization

Method 200 presents the disadvantage that it is not possible to know a-priori for a given computational problem the optimal trade-off between the time allocated per sample and the number of samples to be taken. Therefore, method 200 may, in some instances, operate at a lower than optimal setting. For example, in an implementation where the number of samples is fixed and the number of updates is taken as the time-like parameter, the majority of the effort is allocated to a number of updates, especially for very long runs of the heuristic algorithm. However, in the case where the number of updates is suboptimal (e.g., larger than the optimal value), the heuristic algorithm will run with suboptimal performance. The decrease in performance may be, relative to optimal performance, roughly proportional to the run time of the heuristic algorithm.

It is advantageous to run an algorithm (or sampler) on a computational problem to obtain samples that can be considered random estimates to the problem ground state. Examples of such samplers are Quantum Annealing, Simulated Thermal Annealing, and greedy search. For these types of algorithms, a time budget (throughput) must be divided between number of samples ($n_R$) and time per sample ($t_S$). There is an optimal tradeoff between number of samples and time per sample, which is unknown a-priori for a given computational problem, and failing to run an algorithm at or near the optimal setting when a high throughput is desired, may lead to undesirable consequences, for example an increase (e.g., an exponential increase) in time to optima, time to target, or simply increased residual energy at fixed time.

The systems and methods of the present disclosure describe non-parametric methods for a heuristic optimization that function on all time scales, and on long time scales (e.g., for most challenging problems) have performance within a small constant factor of a sampler tuned optimally. An optimally tuned sampler is here meant to describe a sampler that has been tuned by a standard two stage expensive calibration and then cheap run process. Similar to method 200, the below described method takes advantage of the monotonicity of the time-effort relationship (i.e., the higher the effort the longer the algorithm will run).

The method iterates a time-like parameter from a small value and determines the next value of the time-like parameter on an exponential effort scale so as to minimize time to target, obtaining data at large effort (i.e., large time per sample) only as necessary. In the present description and the appended claims, the term time-like parameter indicates a parameter or setting of the heuristic algorithm that controls in an approximately linear manner the algorithm run time. For example, number of single-spin updates is a time-like parameter on a single threaded CPU, the annealing time is a time-like parameter in the case of Quantum Annealing, while for Simulated Annealing the time-like parameter may be the number of updates or the number of samples to take. For QAOA the time-like parameter may be the circuit depth or the number of gate operations. For non-linear relations of the algorithm run-time, a transformation may be employed to render the relation approximately linear (e.g., for exponential relations, the next value of the time-like parameter may be the square root or the power of two of the current value of the time-like parameter). The method causes the heuristic algorithm to generate solutions at a variety of different effort scales and bootstraps sample the distribution of the generated solutions to compare the energy of the solution achieved at different effort scales. This allows for subsampling to balance different parameterization at equal effort level, then determining which set of parameters provide the optimal tradeoff between energy of the samples and effort level.

As the method is performed and the heuristic algorithm runs and generates solutions, the time to target estimators converge to accurate values, and the target value converges to the optima; thus, on long time scales the method generates samples at a parameterization that minimizes time-to-optima.

The method may be advantageous in optimizing parameters when time to target is a smooth function of the time-like parameter on an exponential time scale. Time to optima and time to (hard-enough) target take this form for annealing algorithms for most standard problem classes, and according to theoretical analysis of quantum (a function of the gap) and thermal (a function of free energy barriers) annealing.

The method may be interrupted at any time, e.g., it can operate with a time-out or a target energy, if desired. However, the method will be near optimal for time-to-target, provided the time-to-target curves are smoothly evolving. In particular, the method may be advantageous to use when a two-stage calibration and run process is not desired.

FIG. 3 is a flowchart of an example method 300 for executing a heuristic algorithm with a variable time-like parameter. Method 300 may be used by a computing system, including a hybrid computing system similar to computing system 100, and executed by a processor, for example digital processor 106. Method 300 may be used for solving computational problems via a heuristic algorithm. The heuristic algorithm may be executed on quantum processor 126 of computing system 100, for example a quantum annealing algorithm may be executed, where the time-like parameter is the annealing time. In at least one implementation, quantum processor 126 may be a gate model quantum processor and digital processor 106 causes a Quantum Approximate Optimization Algorithm (QAOA) to be executed, where the time-like parameter may be circuit depth or the number of gate operations.

Method 300 comprises acts 301 to 318; however, a person skilled in the art will understand that the number of acts is an example and, in some implementations, certain acts may be omitted, further acts may be added, and/or the order of the acts may be changed.

Method 300 starts at 301, for example in response to a call from another routine.

At 302, the digital processor receives a computational problem and the associated parameters and variables, to be solved via a heuristic algorithm. The heuristic algorithm may be, for example a Simulated Annealing algorithm and the parameters associated with the problem may include number of weights and temperature schedule. In other implementations, the heuristic algorithm may be a quantum annealing algorithm or QAOA to be executed on a quantum processor.

At 303, the digital processor initializes a time-like parameters of the heuristic algorithm. Time-like parameters may include the number of updates and the number of samples in Simulated Annealing, and annealing time in a Quantum Annealing. In one implementation, the digital processor initializes the time-like parameter to a minimum value.

At 304, the digital processor executes the heuristic algorithm with the value of the time-like parameter initialized at 303, thereby generating a set of solutions. The set of solutions may be characterized by a minimum energy (i.e., the lowest energy of the samples in the set of solutions). In at least one implementation, the digital processor executes a Simulated Annealing algorithm with the number of updates (S) initialized at 303. In another implementation the digital processor causes a quantum processor, for example quantum processor 126 of computing system 100, to execute a quantum annealing algorithm with the annealing time initialized at 303. In yet another implementation the digital processor causes a gate model quantum processor, for example quantum processor 126 of computing system 100, to execute a QAOA with the circuit depth initialized at 303.

At 305, the digital processor evaluates a stopping criterion. In some implementations, the stopping criterion may be the running time so far (time) being equal or greater than a maximum execution time ($time_{out}$) of the heuristic algorithm and the minimum energy ($en_{min}$) of the set of solution being equal or greater than a target minimum energy ($en_{target}$):

$$time < time_{out} \text{ and } en_{min} > en_{target}$$

If the stopping criteria has not been met, method 300 proceeds to act 306, otherwise to 317.

At 306, the digital processor runs the heuristic algorithm with the current value of the time-like parameter, thereby generating an additional set of solutions. The set of solutions may be characterized by a minimum energy (i.e., the lowest energy of the samples in the set of solutions). The current value of the time-like parameter may be, during a first execution of method 300, equal to the value of the time-like parameter initialized at 303. In at least one implementation, the digital processor executes a Simulated Annealing algorithm with current the number of updates (S). In another implementation the digital processor causes a quantum processor, for example quantum processor 126 of computing system 100, to execute a quantum annealing algorithm with the current annealing time. In yet another implementation the digital processor causes a gate model quantum processor, for example quantum processor 126 of computing system 100, to execute a QAOA with the current circuit depth.

At 307, the digital processor evaluates a first evaluation criterion. In one implementation, the first evaluation criterion may be determining whether the current value of the time-like parameter is larger than a minimum value of the time-like parameter. In some implementations the time-like parameter is the number of updates (S) in Simulated Annealing and the digital processor evaluates whether $S > S_{min}$.

If the first evaluation criterion has been met, control passes to 308, otherwise to 312.

At 308, the digital processor evaluates a second evaluation criterion. In one implementation, the second evaluation criterion may be determining whether the heuristic algorithm running time at the current value of the time-like parameter is within a factor of the running time at a decreased value of the time-like parameter, with the factor being the same factor used for variation of the time-like parameter (e.g., a factor of two, as in the examples below) at 309 and 314. In at least one implementation, the time-like parameter is the number of updates (S) in Simulated Annealing and the digital processor evaluates whether $time(S) < 2 time(S/2)$. If the second evaluation criterion has not been met, control passes to 309, otherwise to 310.

At 309, the digital processor decreases the current value of the time-like parameter. In some implementations, the decreased value of the time-like parameter is half of the current value of the time-like parameter. In some implementations the time-like parameter is the number of updates (S) in Simulated Annealing, and the digital processor updates the value of S (e.g., $S = S/2$). After 309, control returns to 305, where the digital processor evaluates the stopping criterion again.

At 310, the digital processor compares the energies of the set of solutions obtained from executions of the heuristic algorithm with the current value of the time-like parameter and previous executions with the reduced value of the time-like parameter. The digital processor bootstraps one of the two set of solutions and determines the minimum solution energies over the two set of solutions, e.g., $E_S$ and $E_S$. In at least one implementation, the digital processor samples from both sets of solutions of without replacement to determine the minimum solution energy.

At 311, the digital processor evaluates a third evaluation criterion. In one implementation the third evaluation criterion may be determining whether the energy of the set of solutions generated from executing the heuristic algorithm with the reduced value of the time-like parameter (e.g., $E_{S/2}$) is smaller than the energy of the set of solutions generated from executing the heuristic algorithm with the current value of the time-like parameter ($E_S$). In some implementations, the time-like parameter is the number of updates (S) in Simulated Annealing, and the digital processor determines whether $E_{S/2} < E_S$. If the third evaluation criterion has been met, control returns to 309, where the digital processor decreases the current value of the time-like parameter, otherwise to 312.

At 312, the digital processor evaluates a fourth evaluation criterion. In one implementation the fourth evaluation criterion may be determining whether the number of iterations at current value of the time-like parameter is greater than 1. If the fourth evaluation criterion has not been met control returns to 305, otherwise to 313.

At 313, the digital processor evaluates a fifth evaluation criterion. In one implementation the fifth evaluation criterion may be determining whether the running time of the heuristic algorithm at the current value of the time-like parameter is within a factor of the running time at an increased value of the time-like parameter, with the factor being the same factor used for variation of the time-like parameter (e.g., a factor of two) at 309 and 314. In at least one implementation, the time-like parameter is the number of updates (S) in Simulated Annealing, and the digital processor evaluates whether $time(S) < 2 time(2S)$. If the fifth evaluation criterion has been met control passes to 315, otherwise to 314.

At 314, the digital processor increases the current value of the time-like parameter. In one implementation, the increased value of the time-like parameter is double the current value of the time-like parameter. In some implementations the time-like parameter is the number of updates (S)

in Simulated Annealing, and the digital processor updates the value of S (e.g., S=2S). After 314, control returns to 305, where the digital processor evaluates the stopping criterion again.

At 315, the digital processor compares the energies of the set of solutions obtained from executions of the heuristic algorithm with the current value of the time-like parameter ($E_S$) and previous executions with the increased value of the time-like parameter (e.g., $E_{2S}$). The digital processor bootstrap one of the two set of solutions and determines the minimum solution energies over the two set of solutions, e.g., $E_S$ and $E_{2S}$. Control then passes to 316.

At 316, the digital processor evaluates a sixth evaluation criterion. In some implementations the sixth evaluation criterion may be determining whether the energy of the set of solutions generated from executing the heuristic algorithm with the increased value of the time-like parameter (e.g., $E_{2S}$) is smaller than the energy of the set of solutions generated from executing the heuristic algorithm with the current value of the time-like parameter ($E_S$). In some implementations, the time-like parameter is the number of updates (S) in Simulated Annealing, and the digital processor determines whether $E_{2S}<E_S$. If the sixth evaluation criterion has been met, control passes to 314, where the digital processor increases the current value of the time-like parameter, otherwise returns to 305.

At 317, the digital processor returns the set of solutions from the heuristic algorithm, for example from Simulated Annealing.

At 318, method 300 terminates, until it is, for example, invoked again.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Pat. No. 7,533,068 and U.S. Provisional Patent Application No. 63/324,721.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method to improve operation of a computing system for solving a computational problem using a heuristic algorithm, the computing system comprising a digital processor communicatively coupled to a quantum processor that comprises a plurality of qubits, the heuristic algorithm performed by the quantum processor and an amount of computational effort and/or resources used therefor adaptively adjusted based on an amount of time left in a preset run-time of thereof, the heuristic algorithm having at least one effort parameter and a running time, wherein the effort parameter is determinant of an amount of computational work performed and contributes to a length of time used to solve the computational problem, the method comprising:

initializing, by the digital processor, parameters of a meta-algorithm, including at least initialization of a value of the at least one effort parameter of the heuristic algorithm to a first value;

running the meta-algorithm, wherein running the meta-algorithm comprises:

iteratively, until a running time of the heuristic algorithm reaches a time-limit value:

determining, by the digital processor, whether an evaluation criterion has been met, wherein the evaluation criterion is based on the running time and the time-limit value;

adaptively adjusting, by the digital processor, the effort parameter of the heuristic algorithm to an adjusted value, wherein a direction of the adjustment of the effort parameter is based on a result of the determination of whether the evaluation criterion has been met, and running, by at least the quantum processor, the heuristic algorithm with the adjusted value of the at least one effort parameter to obtain a solution set of a plurality of solution sets to the computational problem, wherein the running the heuristic algorithm comprises application of at least one bias signal to the plurality of qubits of the quantum processor to cause performance of quantum computation, and wherein a current solution set of the plurality of solution sets is based on final states of the plurality of qubits as a result of the quantum computation;

and, returning the plurality of solution sets to the computational problem once the running time of the heuristic algorithm reaches the time-limit value.

2. The method of claim 1 wherein:

the initializing parameters of a meta-algorithm further comprises: initializing the time-limit value, and initializing a value of an effort multiplier, wherein the value of the effort multiplier is greater than one; and, determining whether an evaluation criterion has been met, wherein the evaluation criterion is based on the running time and the time-limit value comprises, includes: determining whether a value of the running time is less than a quotient of the time-limit value and the value of the effort multiplier.

3. The method of claim 2, wherein, in response to a determination that the evaluation criterion has been met:

the adaptively adjusting the effort parameter of the heuristic algorithm to an adjusted value comprises: setting the value of the at least one effort parameter to a product of the value of the at least one effort parameter and the value of the effort multiplier; and, the running, by at least the quantum processor, the heuristic algorithm with the adjusted value of the effort parameter comprises: running the heuristic algorithm with the adjusted value of the at least one effort parameter to increase the amount of computational effort and/or resources used therefor.

4. The method of claim 2 wherein, wherein, in response to a determination that the evaluation criterion has not been met:

the adaptively adjusting the effort parameter of the heuristic algorithm to an adjusted value comprises: setting the value of the at least one effort parameter to a quotient of the value of the at least one effort parameter and the effort multiplier; and, the running, by at least the quantum processor, the heuristic algorithm with the adjusted value of the effort parameter comprises: running the heuristic algorithm with the adjusted value of the at least one effort parameter to decrease the amount of computational effort and/or resources used therefor.

5. The method of claim 2, wherein:

the initializing parameters of a meta-algorithm further comprises: initializing a value of a time-per-effort factor; and, in response to a determination that the evaluation criterion has not been met, the adaptively adjusting the effort parameter of the heuristic algorithm to an adjusted value comprises: setting the value of the at least one effort parameter to a value of a remaining running time divided by the value of a time-per-effort factor and divided by the value of the effort multiplier, wherein the value of the remaining running time is a difference between the time-limit value and a current running time.

6. The method of claim 1, wherein the running, by at least the quantum processor, the heuristic algorithm with the adjusted value of the effort parameter to obtain a solution set of a plurality of solution sets to the computational problem includes running, by at least the quantum processor, at least one of: a Quantum Annealing algorithm and a Quantum Approximate Optimization Algorithm.

7. The method of claim 1, wherein the initializing, by the digital processor, parameters of a meta-algorithm, including at least initialization of a value of the at least one effort parameter of the heuristic algorithm to a first value comprises: initializing a value of at least one of: an annealing time, a circuit depth, and a number of gate operations.

8. The method of claim 1, wherein the running, by at least the quantum processor, the heuristic algorithm with the adjusted value of the effort parameter to obtain a solution set of a plurality of solution sets to the computational problem comprises: causing the plurality of qubits in the quantum processor to undergo quantum evolution from a first set of states to the final set of states, the final set of states being the current solution set of the plurality of the solution sets to the computational problem.

* * * * *